US006316039B1

(12) United States Patent
Heyland

(10) Patent No.: US 6,316,039 B1
(45) Date of Patent: Nov. 13, 2001

(54) PROCESS FOR DRYING A FLAVORING AGENT PASTE

(75) Inventor: Sven Heyland, Weiningen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/212,623

(22) Filed: Dec. 18, 1998

(30) Foreign Application Priority Data

Dec. 24, 1997 (EP) .................................................. 97204112

(51) Int. Cl.[7] ....................................................... A23L 1/22
(52) U.S. Cl. ........................... 426/533; 426/534; 426/650; 426/661
(58) Field of Search ..................................... 426/533, 534, 426/535, 536, 537, 538, 656, 650, 661

(56) References Cited

U.S. PATENT DOCUMENTS

| 4,466,986 |   | 8/1984  | Guggenbuehler et al. | 426/533 |
| 4,879,130 | * | 11/1989 | Heyland et al.       | 426/533 |
| 4,965,085 | * | 10/1990 | Heyland et al.       | 426/533 |
| 5,216,945 | * | 6/1993  | Heyland et al.       | 99/348  |

FOREIGN PATENT DOCUMENTS

| 1252476 | 11/1971 | (GB) . |
| 1285568 | 8/1972  | (GB) . |

* cited by examiner

*Primary Examiner*—Leslie Wong
(74) *Attorney, Agent, or Firm*—Winston & Strawn

(57) ABSTRACT

A process for drying a flavoring agent paste obtained by thermal reaction of a pasty mixture that contains at least one free amino acid source and at least one reducing sugar, where a starch having a high gelatinization temperature is added to the paste as a flavor carrier before the paste is dried.

17 Claims, No Drawings

PROCESS FOR DRYING A FLAVORING AGENT PASTE

TECHNICAL FIELD

The present invention relates to a process for drying a flavoring agent paste obtained by thermal reaction of a pasty mixture comprising at least one free amino acid source and at least one reducing sugar.

BACKGROUND ART

In flavoring agent pastes, the flavors are bound to flavor carriers, which in general are natural or synthetic polysaccharides such as native starches, dextrins or vegetable fibers. The paste is dried and the final dry cake is ground to form a flavoring powder. U.S. Pat. No. 4,466,986 describes a process for the preparation of a flavoring agent from a flavor carrier of a maltodextrin. Maltodextrin is added at a cold temperature after reaction of the paste with the entire drying operation carried out under reduced pressure.

During drying, some flavoring agent pastes can behave in a disadvantageous manner. For example, flavoring agent pastes, when placed under vacuum, have in particular a tendency to squirt and/or to swell, thus detrimentally affecting the drying process. Such expansion can occur due to the effect of gases which cannot escape from the paste when it becomes highly viscous under the drying conditions. Such an expansion highly limits the drying capacity of the oven since it is necessary to spread the paste on to plates which takes into account the final volume of the cake. For some pastes, the spreading is only 5 kg of paste per square meter of plate.

Thus, there is a need for improved drying processes for these pastes, and the present invention proposes to overcome these disadvantages.

SUMMARY OF THE INVENTION

The process according to the present invention relates to the addition of a starch having a high gelatinization temperature to the paste as a flavor carrier before the mixture is dried. Drying is accomplished by preferably heating the mixture at 85–95° C. for between about 20 minutes to 2 hours at atmospheric pressure. Advantageously, the heating is continued at about 70–95° C. for about 3 to 6 hours under reduced pressure to further facilitate drying of the paste.

It was observed, surprisingly, that this process indeed makes it possible to overcome the disadvantages of known processes without in any way modifying the organoleptic qualities of the final product which is obtained after the drying and crushing steps.

DETAILED DESCRIPTION OF THE PREFERRED EMBODIMENTS

To carry out the present process, a pasty mixture containing at least one free amino acid source and at least one reducing sugar is heated as described herein.

The free amino acid source is preferably a vegetable or animal protein hydrolysate or a yeast extract. The proportions of free amino acids in the initial pasty mixture may be between about 2 and 40%. The free amino acid fraction may, for example, contain a single amino acid, in particular glutamate, which may then be incorporated into the initial mixture in relatively high proportions, such as up to 30%. The free amino acid fraction may also be a more complex mixture of amino acids resulting from the acid or enzymatic hydrolysis of extracts of microorganisms, in particular of yeasts or of vegetable proteins derived in particular from soya bean or from cakes of oilseeds such as groundnut. Sulphur amino acids are typically incorporated into the mixture. These include cysteine, cystine, methionine or thiamine. It is now known that these acids enhance the meat-like taste of the flavoring agent paste when a Maillard reaction occurs in their presence.

The reducing sugar is preferably a monosaccharide. It may in particular be chosen from xylose, arabinose, fructose and glucose, and can be used alone or as a mixture. This component may be added to the mixture in an amount of about 0.5 to 10%.

The pasty mixture may have a water content of about 20 to 40%, and its pH advantageously may be adjusted to between about 5 and 7. This mixture may be heated for about 1 minute to 6 hours at a temperature of about 80 to 150° C. The paste obtained then may be cooled to about 60–70° C., typically in a tank cooled using cold water. Starch with a high gelatinization power may then be added thereto in proportions of about 3 to 30% by weight of dry matter of the reaction product.

The starch having a high gelatinization temperature is preferably tapioca, maize or potato starch.

The paste obtained may be spread over the plates of a dryer in an amount of about 7 to 18 kg/m². It is then preferably dried in several stages during which the temperature generally decreases with the pressure, in absolute value, also decreasing.

In a first drying stage, the paste is heated at about 85–90° C. for about 20 minutes to 2 hours, at atmospheric pressure, so as to gelatinize the starch within the mass.

During a second drying stage, the gelatinized paste is maintained at a temperature of about 70–95° C. for a period of time of about 3 to 6 hours under a reduced pressure. This second stage may be optionally carried out in several phases of which a first phase includes heating the gelatinized paste for about 1 to 3 hours at about 85–90° C. at an absolute pressure of about 30–60 mbar, and then further heating for about 1 to 3 hours at about 75–90° C. at an absolute pressure of about 15–30 mbar, followed by a final drying stage of about 20 to 90 minutes at about 70–80° C. and at an absolute pressure of about 2 to 15 mbar.

When placed under vacuum, the paste that has been previously solidified during the first drying phase at atmospheric pressure does not and will not squirt and no longer swells at the end of the drying stages.

Drying under reduced pressure may be optionally carried out in several stages and continued until the water content of the pasty mixture is reduced by a factor of between about 5 and 20. Preferably, a water content of about 2 to 4% is obtained in the final cake product.

The final cake product is typically crushed and ground. It may be incorporated into a wide variety of food products such as soup, sauces, condiments and the like. Its organoleptic qualities and its apparent density are identical to those of the products obtained by traditional drying processes, but with yields that are up to 100% higher than those previously made.

The use of a starch having a high gelatinization temperature in such a paste according to the invention has numerous other advantages such as a lower cost compared with other flavor carriers such as dextrins and allows less restrictive drying conditions, allowing broader temperature ranges.

EXAMPLES

The invention will be understood more clearly with the aid of the examples below in which the percentages and parts are indicated by weight.

Example 1

There are incorporated into a paste of groundnut cake hydrolysate containing 70% dry matter, 40% free amino acids and of pH 6.8, 2% inosine monophosphate, 2.7% cysteine hydrochloride, 1.3% xylose, 0.6% glucose and 3.4% chicken fat. This mixture is vigorously mixed for 10 minutes and heated at a temperature of 100° C. for a period of 3 hours. The paste is transferred to a jacketed tank which is cooled with cold water and the temperature of the mixture is reduced to 60–70% C.

Tapioca starch is then added in an amount of 20% by weight of dry matter of the reaction product. The paste is vigorously mixed for 10 minutes and then it is spread over the plates of an oven in an amount of 10 kg/m$^2$. The paste is then dried at atmospheric pressure for one an a half hours at 90° C. and then for 1 hour at 90° C. at an absolute pressure of 15 mbar. The oven temperature is then reduced to a value of 75° C. and the drying is continued at an absolute pressure of 15 mbar for 2 hours. The drying is completed at 75° C. for 1 hour at an absolute pressure of 2 or 3 mbar.

A dried paste is obtained which is only slightly thick and compact, which is crushed and reduced to a powder. The flavoring agent obtained has a fine taste with excellent organoleptic qualities.

Example 2

The reacted paste is prepared as described in example 1, but beef fat is used instead of chicken fat.

To this paste, 10% of native corn starch is added. After homogenisation the paste is filled on trays, trayloading 18 kg per m$^2$. The drying is carried out at 90° C. for 1.5 hours without vacuum, then 2 hours at 90° C. with 15 mbar vacuum and as last step 1 hour at 90° C. with 2 mbar vacuum.

The milled product dissolved in hot water at a concentration about 1%, has a desirable boiled taste and smell.

What is claimed is:

1. A process for producing a dried flavoring agent paste which comprises the steps of:
   preparing a pasty mixture of at least one free amino acid source and at least one reducing sugar;
   heating the pasty mixture to induce a reaction between the amino acid source and reducing sugar;
   adding a starch to the thermally reacted paste;
   drying the paste by initially heating the starch-containing paste at about 85–95° C. for above 20 minutes to 2 hours at atmospheric pressure, followed by further heating at about 70–95° C. for about 3 to 6 hours under reduced pressure to form the dried flavoring agent paste.

2. The process of claim 1 in which the heating of the pasty mixture is done for about 1 minute to 6 hours at about 80–150° C., the paste obtained thereby is cooled to about 60–70° C. and then about 3 to 30% by weight of the starch is added to the cooled paste before drying.

3. The process of claim 1 in which the starch is tapioca, maize or potato starch.

4. The process of claim 1 wherein the drying step includes further heating under reduced pressure in several stages, at generally decreasing absolute pressure values and at generally decreasing temperatures.

5. The process of claim 4, in which the further heating step is conducted under reduced pressure in a first stage for about 1 to 3 hours at about 85–90° C., in a second stage for about 1–3 hours at about 75–90° C. at about 15–30 mbar and then in a third stage for about 20–90 minutes at about 70 to 80° C. at about 2 to 15 mbar.

6. The process of claim 1 wherein the free amino acid source is a vegetable or animal protein hydrolysate or a yeast extract and the reducing sugar is a monosaccharide.

7. The process of claim 1 wherein the drying step is conducted at a temperature and for a time sufficient to reduce the water content of the pasty mixture by a factor of about 5 to 20.

8. The process of claim 1 wherein the pasty mixture initially has a water content of about 20 to 40% and is dried so that the dried paste has a residual water content of about 2–4%.

9. The process of claim 1 wherein the free amino acid source is a single amino acid, a mixture of amino acids, a vegetable or animal protein hydrolysate or a yeast extract and is present in the pasty mixture in an amount of between about 2 to 4% by weight, and the reducing sugar is one or more of xylose, arabinose, fructose or glucose and is present in the pasty mixture in an amount of between about 0.5 and 10% by weight.

10. The process of claim 1 wherein the starch is tapioca maize or potato starch, the pasty mixture has a pH that is adjusted to the range of about 5 to 7, and the dried paste is ground to powder.

11. The process of claim 1 wherein the starch is tapioca starch.

12. The process of claim 1 wherein the pasty mixture initially has a water content of about 20 to 40% and is dried so that the dried paste has a residual water content of about 2–4%.

13. A process for producing a dried flavoring agent paste which comprises the steps of:
   preparing a pasty mixture of at least one free amino acid source and at least one reducing sugar;
   heating the pasty mixture for about 1 minute to 6 hours at about 80–150° C. to induce a reaction between the amino acid source and reducing sugar;
   cooling the reacted paste to about 60–70° C.;
   adding about 3 to 30% by weight of a starch to the cooled paste; and
   drying the paste by initially heating the starch-containing paste at about 85–95° C. for above 20 minutes to 2 hours at atmospheric pressure, followed by further heating at about 70–95° C. for about 3 to 6 hours under reduced pressure in several stages to form the dried flavoring agent paste.

14. The process of claim 13, in which the heating step is conducted under reduced pressure in a first stage for about 1 to 3 hours at about 85–90° C., in a second stage for about 1–3 hours at about 75–90° C. at about 15–30 mbar and then in a third stage for about 20–90 minutes at about 70 to 80° C. at about 2 to 15 mbar.

15. The process of claim 13 wherein the free amino acid source is a single amino acid, a mixture of amino acids, a vegetable or animal protein hydrolysate or a yeast extract and is present in the pasty mixture in an amount of between about 2 to 4% by weight and the reducing sugar is one or more of xylose, arabinose, fructose or glucose and is present in the pasty mixture in an amount of between about 0.5 and 10% by weight.

16. The process of claim 13 wherein the starch is tapioca, maize or potato starch, the pasty mixture has a pH that is adjusted to the range of about 5 to 7, and the dried paste is ground to powder.

17. The process of claim 13 wherein the starch is tapioca starch.

* * * * *